United States Patent [19]

Kuts

[11] 3,757,618
[45] Sept. 11, 1973

[54] FABRIC CUTTING
[75] Inventor: Mathew Kuts, Akron, Ohio
[73] Assignee: The B. F. Goodrich Company, New York, N.Y.
[22] Filed: Oct. 1, 1971
[21] Appl. No.: 185,544

Related U.S. Application Data
[63] Continuation-in-part of Ser. No. 146,193, May 24, 1971, abandoned.

[52] U.S. Cl.................. 83/471.3, 83/483, 83/486, 83/488, 83/508, 83/676
[51] Int. Cl............................................. B23d 19/02
[58] Field of Search ........................... 83/483–489, 614, 578, 582, 471.3, 477, 477.1, 676, 508, 486, 486.1

[56] References Cited
UNITED STATES PATENTS

| | | | |
|---|---|---|---|
| 3,207,019 | 9/1965 | Vanzo et al. | 83/508 X |
| 3,686,991 | 8/1972 | Fujimoto | 83/582 X |
| 342,127 | 5/1886 | Panyard | 83/489 X |
| 1,914,528 | 6/1933 | Reid | 83/508 X |
| 245,151 | 8/1881 | Fowler | 83/487 X |
| 1,975,219 | 10/1934 | Alexander et al. | 83/676 X |
| 2,605,840 | 8/1952 | Parker | 83/483 X |

Primary Examiner—J. M. Meister
Attorney—Joseph Januszkiewicz et al.

[57] ABSTRACT

Bias cutting of rubberized fabric material wherein a carriage is reciprocated on a support frame, which frame is adjusted angularly to determine the bias angle of cut. A cutter support is mounted on the carriage for pivotal adjustment about a vertical axis to position the cutter that it supports to provide for a shearing cutting action. Such cutter support journals for rotation a shaft that supports on one end a rotating cutter with a plurality of circumferentially spaced linear cutting edges. A spring on the other end of the shaft biases the cutters into shearing engagement with a cutter guide over which the fabric material is to travel and is positioned for cutting. The cutting action of the cutters is a shearing action as the cutter and carriage are reciprocated across the support frame. In lieu of a single carriage and cutter, a pair of cutter supports may be continuously guided in an orbital path so that the rotary cutters cut in one portion of the path.

22 Claims, 14 Drawing Figures

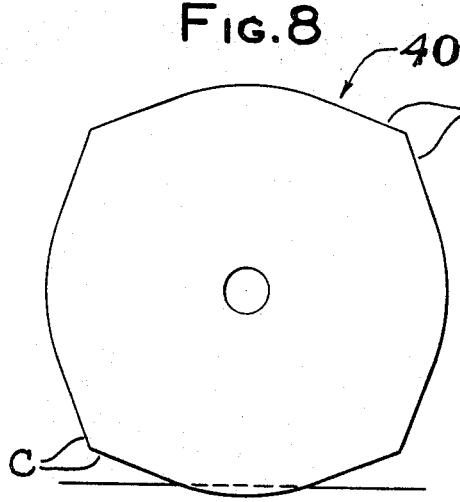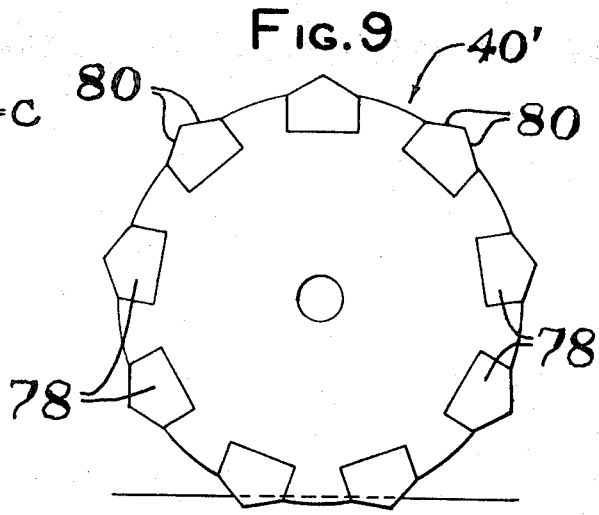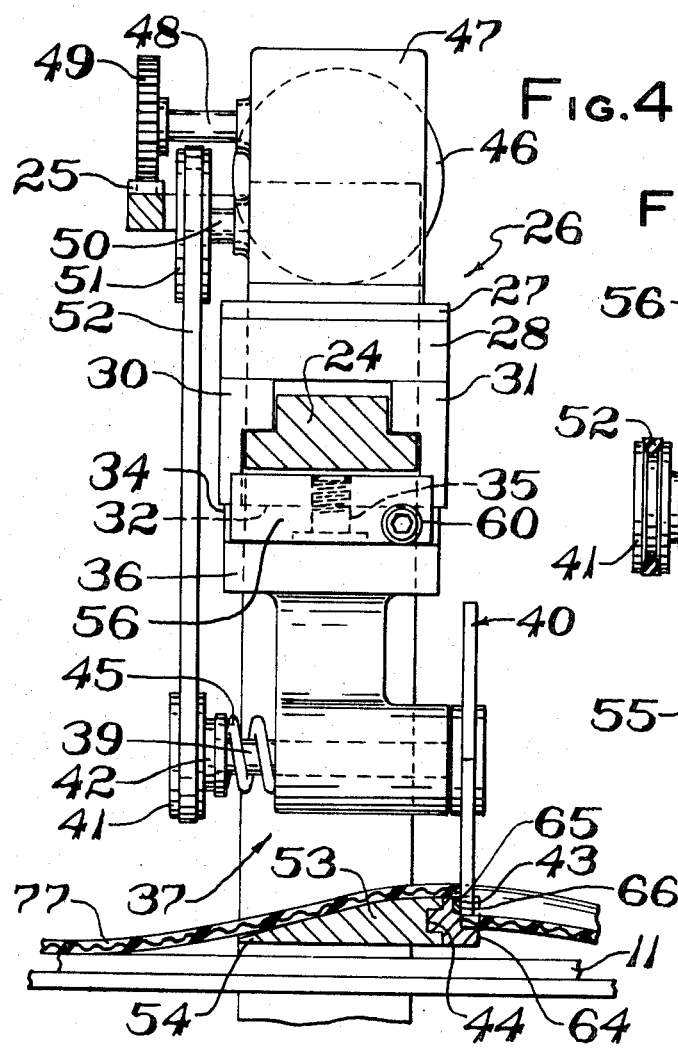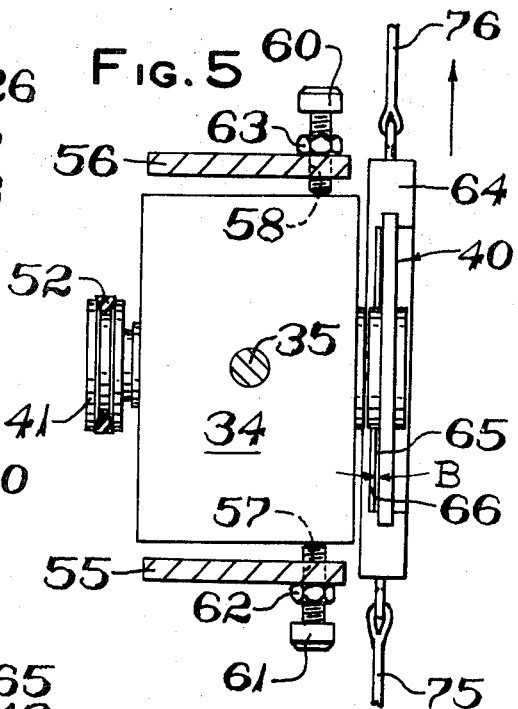

FABRIC CUTTING

CROSS REFERENCE TO RELATED APPLICATION

This application is a continuation-in-part of U. S. Pat. application Ser. No. 146,193 filed May 24, 1971, now abandoned.

BACKGROUND OF THE INVENTION

This invention relates to pneumatic tire manufacture and more particularly to a bias cutting apparatus of building ply stock employed in the construction and manufacture of pneumatic tires.

In the manufacture of pneumatic tires, one of the principal members used to build the basic tire carcass is a thin sheet of uncured rubber-like material known as a fabric, building ply or building ply stock. In the manufacture of such building ply, parallel cords of fabric are passed through a pair of rolls in cooperation with calendering rolls which work and calender unvulcanized rubber onto the parallel cords as they pass through the pinch rolls to form a continuous sheet with parallel strands of cord fabric embedded therein. Thereafter, such sheet material is bias cut into sections of fabric which are then spliced end to end to give a building ply or building ply stock with cords therein located at a desired bias angle relative to the longitudinal center line of the building ply. The layers of fabric are applied to a tire building drum in such a manner that cord members of overlapping plies criss-cross with respect to the cord members above or below. The tire beads are then set against the ends of the plies and the plies turned thereover. Additional plies, chafer strips, sidewall strip, breakers, overhead belts and a tread ply may be applied in varying orders, and stitched thereto. Such carcass is substantially a flat band, wherein the angle is measured between the cords and the circumferential line around the crown of the tire in the case of pneumatic passenger tires is approximately 60 degrees. After the removal of such green tire, the tire is given a toroidal shape during vulcanization or on a second machine prior to vulcanization, wherein the angle after vulcanization is now 30 to 35 degrees depending on many factors including drum set. The described process has generally referred to tires manufactured from fabric, however, the present invention is also directed to building plies which use non-extensible cord materials such as nylon and wire. In the processing of building plies containing wire, processing has been difficult because of the inherent difficulty in cutting wire, which cutting is particularly compounded by the very low bias angle cutting on such stock wherein the cutters tend to push and displace the wire ends, which action distorts the stock.

In bias cutting rubberized cloth fabric, the conventional method of cutting is to use a pair of fingers that lift the fabric away from the conveyor belt on which it travels, so that a rapidly rotating cutter disk above the fingers cuts the fabric. The application of this apparatus and method to rubberized wire fabric is difficult and unsatisfactory. Where the speed of rotation of the rotating cutter is greater than the linear speed of the cutter as it moves across the material to be cut, the tendency is to gather the material due to the action of the rapidly rotating cutter; whereas if the rotational speed is less than the linear speed, the tendency is to push the fabric material ahead of the cutter. The rotating cutter of the present invention has a plurality of circumferentially spaced cutting edges which are linear, giving the cutter a downwardly cutting or shearing action in cooperation with a support cutting edge as opposed to a rolling action of a circular cutter.

In having a pair of circular cutters with overlapping edges operating on wire fabric, the linear speed of movement of the cutters must be matched to the rotating speed of the cutters to facilitate a cutting action, whereas the cutting action of the blade of the instant invention is a shearing action and it is not critical what speed the cutter would be rotated at since the shearing action is not dependent on speed. The cutting action of the instant invention is like that of a pair of tin snips wherein the cutting action is downward as it moves across the material to be cut.

SUMMARY OF THE INVENTION

The present invention contemplates an apparatus and method that utilizes a carriage which is mounted on a support frame for reciprocal movement on a guideway. The support frame may be adjusted to determine the bias angle to be cut. Suspended below the carriage is a cutter support member which is mounted on the carriage for pivotal adjustment about a vertical axis. The cutter support member supports a rotating cutter. Such cutter support member may either be adjustably mounted on the carriage to adjust the angle of the cutter thereon as it makes its cut or the carriage may be allowed to move between a pair of spaced stops so that the cutter therein may make its cut in either direction of travel since the cutter angle will be slanted relative to the cutting surface of the fabric. The cutter support member journals a support shaft which has a rotating cutter on one side thereof and a biasing spring on the other side which biases the cutter into engagement with the cutting edge of the guide plate over which the fabric material is positioned and is to be cut. The biasing action of the spring in cooperation with the pivotal mounting of the support member facilitates the cutter to give a shearing action. The rotating cutter would have a plurality of circumferentially spaced cutting edges, which edges are linear, giving the cutter a downward shearing action.

A modification of the invention is to have at least a pair of spaced carriages that travel over a guideway that provides an orbital path having an upper return run and a lower cutting run. The carriages and the cutter support members thus travel in a continuous closed loop such that as one cutter and carriage is cutting, the other or second cutter and carriage is moving into a position to prepare for a cutting action.

FIG. 4 is a side elevational view of the carriage and cutting means of the bias cutting apparatus.

FIG. 5 is a plan view of the cutter and cutter support member showing the angularity of the cutter.

FIG. 6 is a plan view of a modified form of cutter and cutter support member.

FIG. 7 is a plan view of another modified form of cutter and cutter support member.

FIG. 8 is a front elevational view of the cutter blade.

FIG. 9 is a front elevational view of a modified form of cutter blade.

FIG. 10 is a fragmentary cross-sectional view of the lower portion of the carriage and the cutter support member.

DETAILED DESCRIPTION

Figure 1:
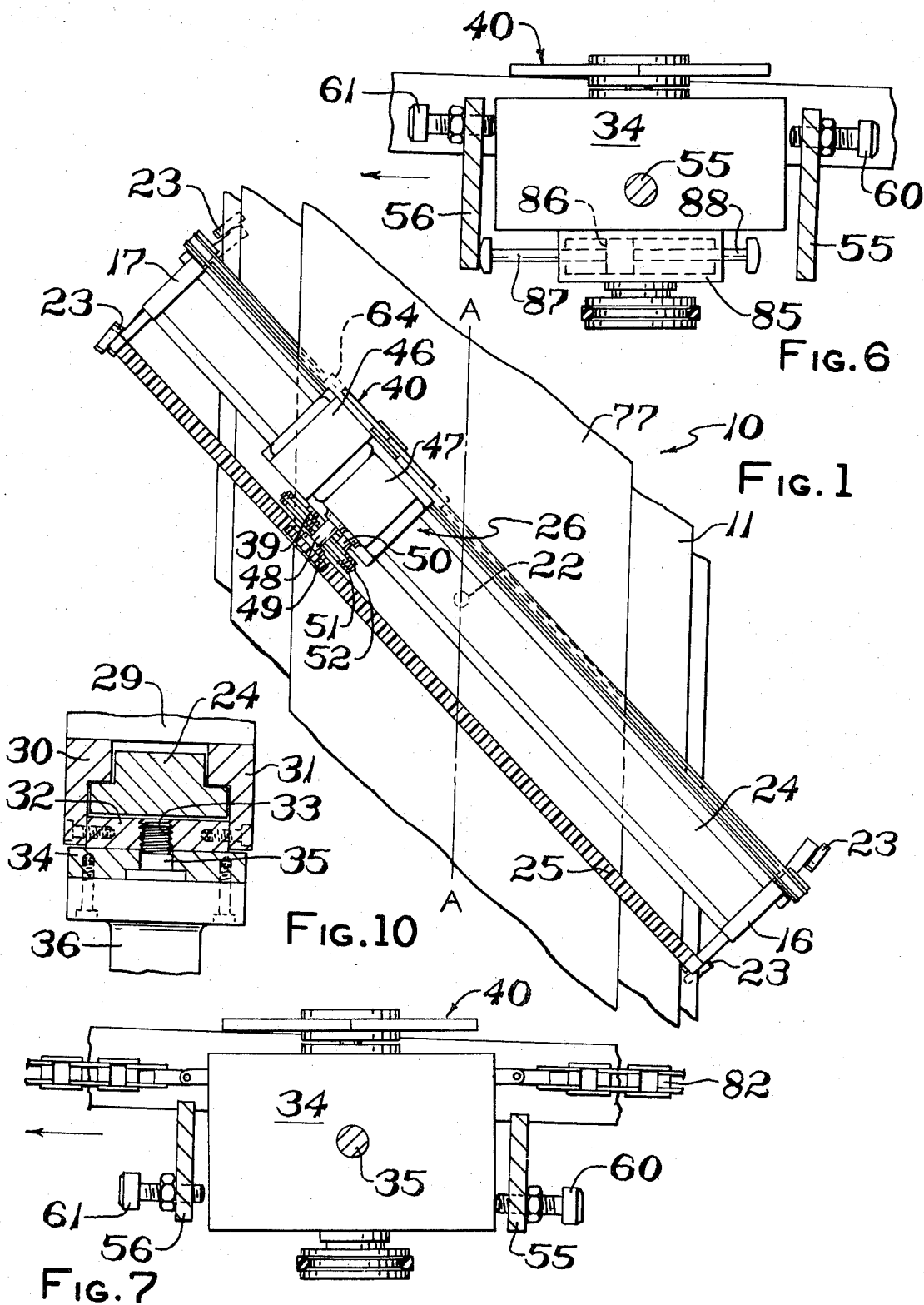
FIG. 1 is a fragmentary plan view of a bias cutting apparatus with a portion of the conveyor shown.
Figure 2:
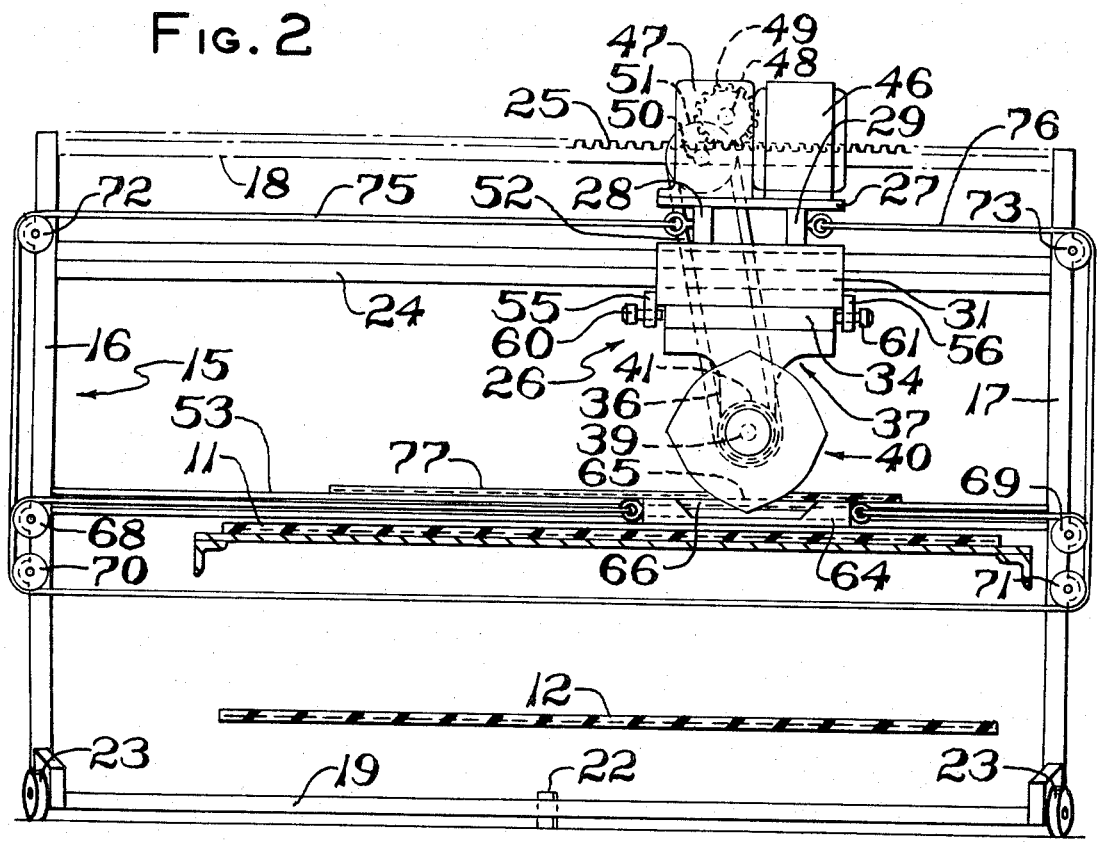
FIG. 2 is a front elevational view of the bias cutting apparatus with only portions of the conveyor shown.

Referring to the drawings wherein like reference characters designate like or corresponding parts throughout the several views, there is shown in FIG. 1 an endless conveyor belt 10 that is supported at spaced ends thereof by suitable rollers driven in the manner old and well-known in the art. Conveyor belt 10 has an upper conveying run 11 and a lower return run 12. Suitable guide and support means are provided to guide the belt in its travel. Supporting framework 15 shown generally in FIG. 2 has a pair of spaced upwardly extending support members 16 and 17 with suitable cross supports including upper cross support 18 and a lower cross support 19. Lower support 19 has a pivot mounting 22 at its intermediate portion suitably journaled in the floor of the installation, about which the support framework 15 can be pivotally adjusted. A plurality of spaced rollers 23 are suitably mounted on respective lower end portions of supporting framework 15 to facilitate the angular adjustment of the supporting frame 15 and the bias cutting apparatus to be described. Upper support 18 has a rack 25 suitably secured thereto for the purpose to be described. Extending between the upper portions of support members 16 and 17 is a horizontally extending guideway 24, which guideway 24 is suitably recessed on its respective upper side edge portions to provide an inverted T-shaped guide bar or guideway as viewed in cross-section and shown in FIG. 4. Mounted for reciprocal movement on T-shaped guideway 24 is a carriage 26 which comprises an upper plate member 27, blocks 28 and 29, (FIGS. 2 and 3), side plates 30, 31 (FIG. 4), and a lower plate 32. Lower plate 32 has a centrally threaded bore 33 such that a plate member 34 may be pivotally secured thereto as by a threaded bolt 35 which acts as a pivotal means. Secured to plate member 34 is a downward extending housing 36 which in cooperation with plate member 34 comprises a cutter support member 37 which is pivotally mounted on carriage 26. The lower portion of housing 36 journals for rotation a shaft 39, which has a cutter 40 secured to one end thereof for a purpose to be described. The other end portion of shaft 39 has a pulley 41 secured thereto along with a flange member 42. Encompassing shaft 39 between flange 42 and housing 36 is a compression spring 45 which biases cutter 40 leftwardly as viewed in FIG. 4 towards housing 36.

Mounted on upper plate member 27 is a motor 46 which has its output connected to a speed reducer 47. Speed reducer 47 has a first output shaft 48 connected to a spur gear 49 which meshes with rack 25 for reciprocating the carriage 26 and cutter support member 37 on guideway 24. Speed reducer 47 has a second output shaft 50 on which is mounted a pulley 51. A V-belt 52 trained about pulley 51 and pulley 41 transmits an output from reducer 47 to cutter 40 rotating cutter 40 at a high speed. In lieu of motor 46 and driving speed reducer 47, other conventional means may be used to reciprocate the carriage 26 and a separate motor to drive or rotate cutter 40.

Figure 3:
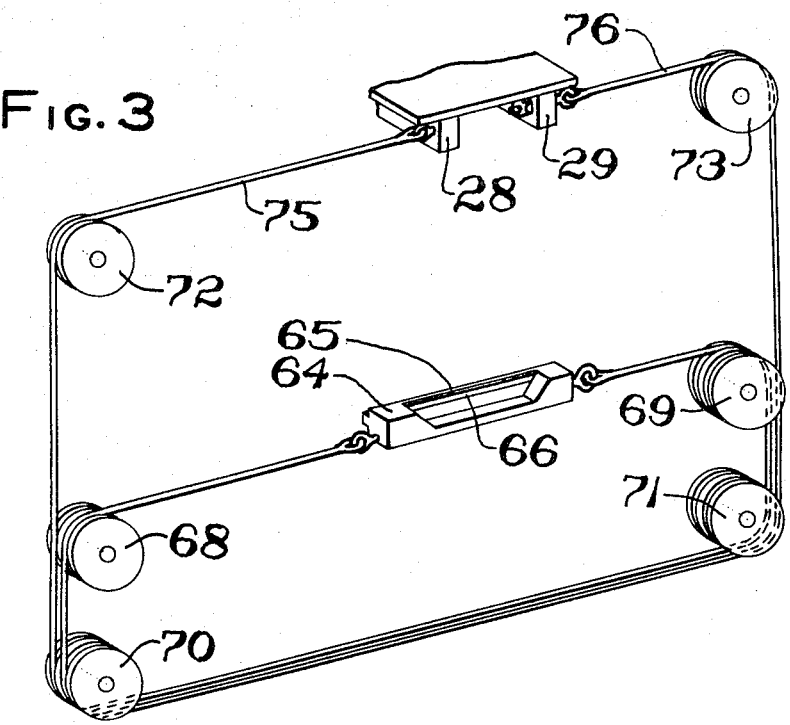
FIG. 3 is a schematic isometric view of a portion of the carriage and anvil of the bias cutting apparatus with the interconnecting means for effecting simultaneous movement of the carriage and anvil.

Cutter support member 37 is pivotally adjusted on carriage 26 through the utilization of a pair of spaced plates or brackets 55 and 56 (FIGS. 4 and 5), which brackets are suitably secured to lower plate 32 of carriage 26. The respective brackets or plates 55 and 56 have threaded bores 57 and 58 which threadedly receive set screws 60 and 61, which in turn have lock nuts 62 and 63 secured thereto. The lower plate member 34 through the setting on set scress 60 and 61 can be angularly adjusted relative to the lower plate 32. The amount of inclination for angular adjustment of plate member 34 relative to lower plate member 32 is exaggerated in FIG. 6 and FIG. 5 to illustrate for clarity purposes the type of action which rotating cutter 40 makes with respect to the fabric. Extending laterally between vertical support members 16 and 17 is a guide bar or guide plate 53 which has a leading edge 54 and a trailing edge 43 as shown in FIG. 4. Trailing edge 43 is recessed to provide a guideway 44 in which is mounted for reciprocal movement an anvil 64. Anvil 64 is shown in FIG. 3 as recessed providing a cutting edge 65. In lieu of anvil 64 and cutting edge 65, the trailing ecge of guideplate 53 may be a continuous uninterrupted surface extending the full length of guideplate 53 presenting a longitudinal extending cutting edge. Traveling anvil 64 has a replaceable tungsten carbide insert 66 which is made of tool steel to insure a sharp cutting edge that is durable and easily replaceable. As shown in FIG. 5 the cutting edge 65 of anvil 64 makes an angle "B" with respect to the planar surface of cutter 40. As shown in FIG. 8, cutter 40 has a plurality of linear cutting surfaces indicated as "C" such that during the rotation of cutter 40 a portion of at least one linear surface is at all times in contact with the cutting edge 65 of the anvil 64. Vertical support members 16 and 17 have pulleys 68 and 69 respectively journaled thereon substantially in line with the anvil 64. Located directly beneath pulleys 68 and 69 are pulleys 70 and 71. Journaled on vertical support members 16 and 17 are pulleys 72 and 73 substantially in line with the respective blocks 28 and 29 of carriage 26. A cable 75 having one end secured to block 28 is trained over pulleys 72, 68, 70, 71 and 69 and has its other end connected to anvil 64. Another cable 76 having one end connected to block 29 of carriage 26 is trained about pulleys 73, 69, 71, 70, and 68, and has its other end connected to anvil 64. Such an arrangement of cables will assure the synchronous movement of carriage 26 and anvil 64 in the same linear direction such that the cutter edge of anvil 64 will move with the cutter 40 as cutter 40 rotates and travels with carriage 26.

In the operation of the apparatus described assuming that the Line A—A in FIG. 1 represents longitudinal center line of the endless conveyor 10 and a fabric 77 is being moved therewith. Support frame 15 is adjusted such that its guide way 24 makes an acute angle with respect to such longitudinal center line A—A. Such supporting frame 15 is secured in any suitable manner to the floor or base to prevent movement about pivotal means 22. Endless conveyor belt 10 is intermittently energized to move a pre-selected amount of fabric 77 to the cutting apparatus in a manner old and well-known in the art. During such movement of the belt 10, the fabric is moved up and over the guide plate 53 facilitated by the leading edge 54. Upon stopping of the conveyor belt 10, motor 46 is energized which thereby moves carriage 26 across guideway 24 while cutter 40 is rotated at a high speed through the output shaft 50 which transfers its output to endless belt 52 and thence to shaft 39. As shown in FIG. 5 the cutting edge of cutter 40 makes a slight angle with respect to the cutting edge 65 of anvil 64 through the adjustment of set screws 60 and 61 which maintain this adjustment for the entire cut as carriage 26 moves across the fabric. Such inclination of the cutting edge"C" of cutter 40 performs a spinning action which is a downward movement of the linear cutting edg4e"C" across the fabric such that the wire cords embedded in the fabric are cut efficiently without displacing the wire strands or cord, wherein such action is similar to that of tin snips moving across a wire fabric. Such action is similar to that of scissors which maintains point contact between the cutters only at the point of cutting and not a contact across the entire cutting edge of the plate. This in conjunction with the downward cutting action of the cutting edge assures an efficient cut. Upon completion of the cut, motor 47 is de-energized and then reversed, to move the carriage 26 back to its initial position for a subsequent cut after fabric 77 is moved along with conveyor 10.

A modification of the cutting means and adjustment of the cutter support member is shown in FIGS. 6 and 7. In FIG. 7 the plate member 34 is connected to a chain 82 which is suitably connected to a drive means which is operated to reciprocate or pull the plate or slide member 35 first in a rightward direction as viewed in FIG. 7 and then a leftward direction as indicated in FIG. 7. Through this action the drive means for carriage 26, such as spur gear 49 is eliminated and the plate member 34 is automatically tilted about the pivotal means or bolt 35 through the pulling action of the chain 82. The amount of pivot is determined by the extent of adjustment of set screws 60 and 61 as in the original embodiment. When chain 82 is pulling in the leftward direction the rearward potion of plate member 34 abuts set screw 60 and maintains the cutter 40 at a slight acute angle relative to the cutting edge of the anvil, thereby assuring a shearing action. The embodiment shown in FIG. 6 modifies the pivoting angle of the plate member 34 relative to the carriage 26 through the action of a pressurized cylinder 85 which has a piston 86 connected to a pair of oppositely extending piston rods 87 and 88. Upon pressurization of the one end or the other end of cylinder 85 a pre-selected piston rod will engage either bracket 55 or 56 and determine the inclination of the plate member 34. As in the previous embodiments the amount of inclination is determined by the set screws 60 and 61 which inclination effects the shearing action or snipping action of the cutter relative to the wire cord fabric. The advantage of the embodiments shown in FIGS. 6 and 7 is that the cutter can operate in either direction of travel such that the carriage is not required to return to its initial starting position before it makes its next cut but may make its cut in either direction of travel.

FIG. 9 discloses a modified cutter 40' wherein a plurality of cutting elements 78 are mounted on the cutter body wherein each cutting element has a pair of linear cutting edges 80. As illustrated in FIG. 9 at least one cutting edge is in contact with the anvil at all times to maintain a shearing action on the wire fabric, which shearing action is a downward cutting action which facilitates the cutting of wire fabric without displacement of such fabric. The speed of the cutter is not critical since the action is that of a shearing action and will not tend to push or gather the material.

Figure 11:
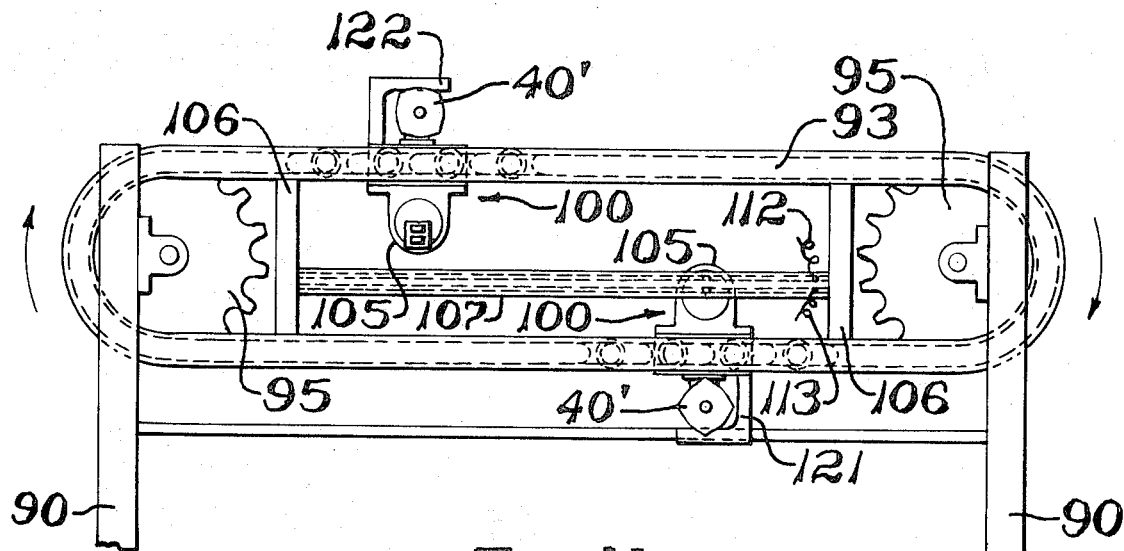
FIG. 11 is a front elevational view of a modified form of bias cutting apparatus with only the upper portion shown without the conveyor.
Figure 12:
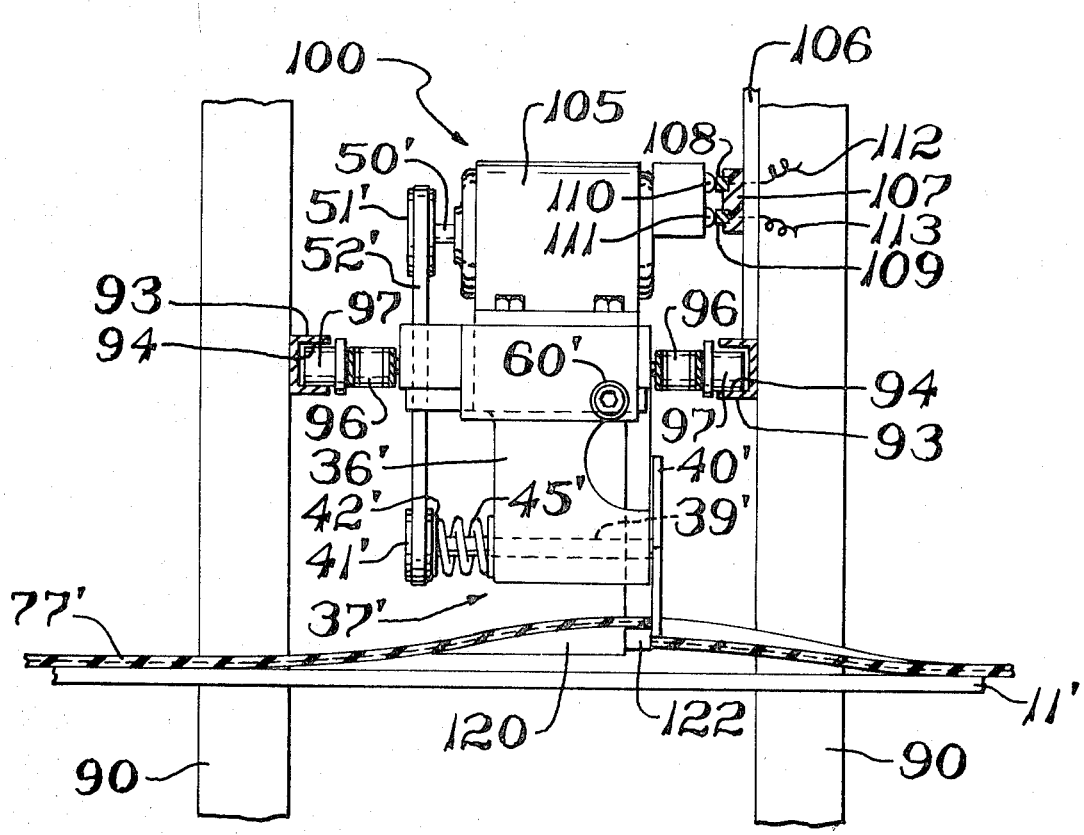
FIG. 12 is a side elevational view of the carriage and cutting means shown in FIG. 11.
Figure 13:
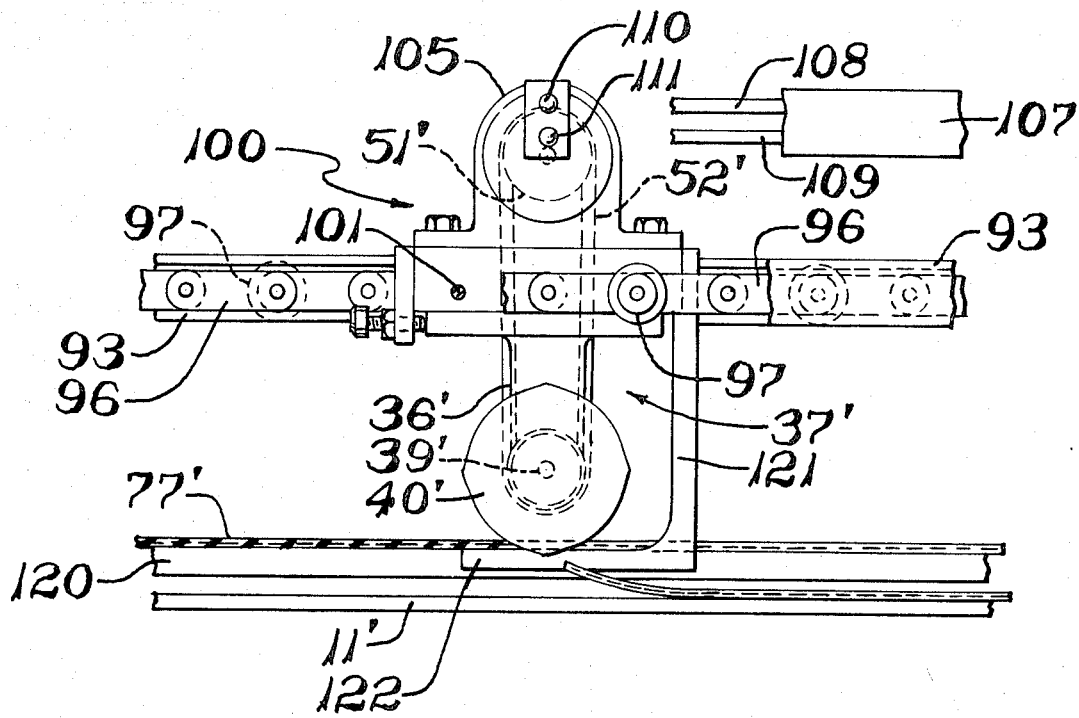
FIG. 13 is an enlarged fragmentary front elevational view of the carriage.
Figure 14:
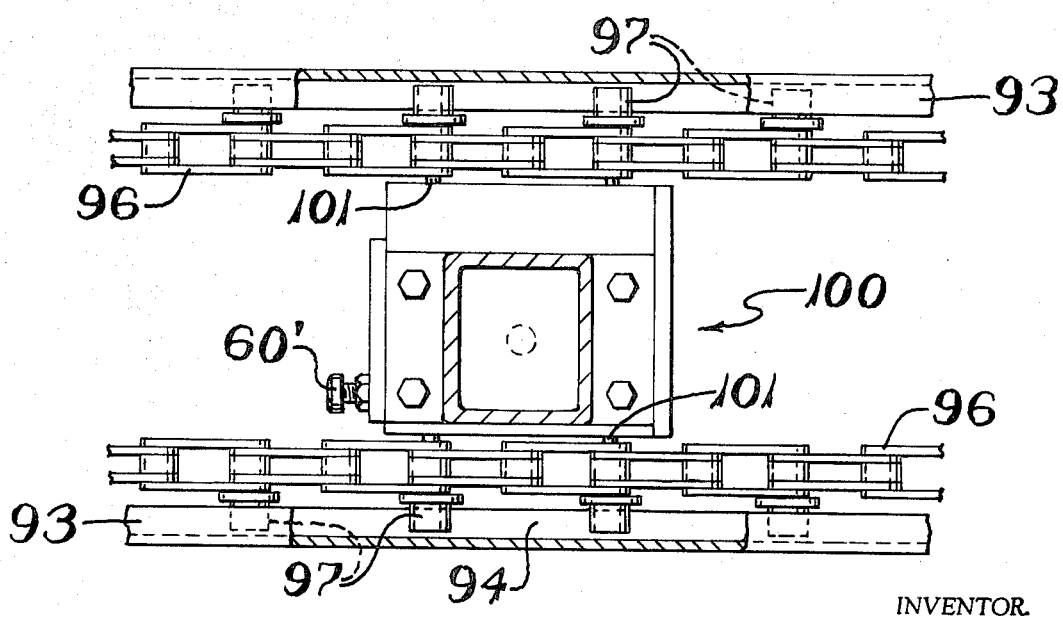
FIG. 14 is a fragmentary plan view of a portion of the carriage being guided by rollers and chain.

A modification of the apparatus described is shown in FIGS. 11 through 14 inclusive. Therein, a plurality of vertically extending support member 90 support a pair of spaced oval shaped guideways 93—93. The supports 90 are similar to support members 16 and 17 which may be pivoted about a pivot mounting as mounting 22 to adjust the bias cutting apparatus. Each guideway 93 is U-shaped in cross section with the respective open portions 94 facing each other as shown in FIG. 12. FIG. 11 only shows the front guideway 93, while FIG. 12 discloses the lower return runs of the front and rear guideways 93.

Suitably journaled for rotation on the respective forwardly and rearwardly disposed support members 90 are sprockets 95. The drive means for the sprockets 95 is not shown, however, such drive means may be conventional motor and transmission means, old and well-known in the art. Trained about each pair of forwardly and rearwardly disposed sprockets 95 is a closed loop chain 96 (FIG. 13 and 14) having certain of the outer links thereof journaling for rotation guide rollers 97. The guide rollers 97 are journaled in the U-shaped guideways 93. Suitably mounted for movement with the chains 96 are a pair of spaced carriages 100. The carriages are identical in construction and only one will be described. Each carriage 100 has a pair of spaced pins 101 connected to each chain 96 to carry such carriage 100 in its movement along with chian 96.

Carriage 100 is similar in construction to the carriage 26 described in the first embodiment wherein such carriage 100 has a cutter support member 37' pivotally mounted thereon. The lower portion of member 37' journals for rotation a shaft 39', which has a cutter 40' secured to one end thereof. The other end portion of shaft 39' has a pulley 41' secured thereto along with a flange member 42'. Encompassing shaft 39' between flange 42' and a housing 36' is a compression spring 45' which biases cutter 40' leftwardly as viewed in FIG. 12 towards housing 36'.

Mounted on the upper portion of support member 37' is a motor transmission means 105 which has its output shaft 50' supporting a pulley 51'. A V-belt 52' is trained about pulley 51' and pulley 41' to transmit an output to cutter 40', rotating cutter 40' at a high speed. In lieu of motor transmission means 105 other conventional means may be used to rotate the cutter 40'.

The forwardly disposed U-shaped guideways 93 support a pair of vertically extending braces 106, between which is mounted a bus bar 107 having a pair of longitudinally extending conductors 108 and 109. Brushes 110 and 111 are provided on motor 105 to make contact with the conductor 108 and 109. Suitable lead 112 and 113 are connected to conductors 108 and 109 to provide for the energization and de-energization of motor means 105 during its travel along the oval path of guideways 93. Such conductor 108 and 109 provide energy for the motor 105 and the rotation of cutter 40' only during the lower portion of its travel.

Cutter support member 37' is pivotally adjusted on carriage 100 in the same manner as support member 37 on carriage 26 as described in the first embodiment with corresponding numerals designated by primed numbers. Extending laterally between the forwardly disposed vertical support members 90 is a tapered guide bar or guide plate 120 which has a trailing edge and a leading edge similar to plate 53 to assist the movement of the fabric 77' and position such fabric prior to cutting.

Secured to carrige 100 is an L-shaped bracket 121 having its lower leg portion or anvil 122 suitably abutting guide plate 120. Guide plate 120 may be recessed to accommodate the linear movement of the anvil 122 to assure that it will not give when cutter 40' is operating against such anvil during the cutting action. The cutter 40' is similar to cutter 40 previously described having a plurality of linear cutting surfaces such that during the rotation of cutter 40', a portion of at least one linear surface is at all times in contact with the cutting edge of the anvil 122.

Various modifications are contemplated and may obviously be resorted to by those skilled in the art without departing from the described invention, as hereinafter defined by the appended claims, as only a preferred embodiment thereof has been disclosed.

1. A bias cutting apparatus for cutting rubberized fabric comprising a support frame, mounting means for pivoting said support frame about a central pivot point for swinging said support frame to predetermined positions, guideway means mounted on said support frame, carriage means mounted on said guideway means for movement thereon, a cutter support pivotally mounted on said carriage means for adjustment about a vertical axis, cutter means mounted on said cutter support for rotation thereon, said cutter means having a plurality of circumferentially spaced linear cutting edges, spring means operatively engaging said cutter means for biasing said cutter means toward said cutter support, motive means connected to said cutter means for rotating said cutter means on said cutter support, a guide plate mounted on said support frame in alignment with said guideway means, an anvil mounted on said guideway, means interconnecting said anvil and carriage for simultaneous movement in the same linear direction, adjustable stop means mounted on said carriage for limiting the pivotal movement of said cutter support about said vertical axis on said carriage means between a pair of limits, and drive means connected to said cutter support for selectively moving said cutter support and said carriage means on said guideway while pivoting said cutter support into abutting contact with one of said adjustable stop means 2. A bias cutting apparatus as set forth in claim 1 wherein said adjustable stop means comprises a pair of spaced brackets mounted on said carriage, each bracket supporting at least one set screw for limiting the pivotal movement of said cutter support toward said set screw.

3. A bias cutting apparatus for cutting elastomeric fabric comprising a support frame, guide means on said support frame providing a continuous closed endless loop, said guide means having a lower horizontal run and an upper return run, carriage means mounted for movement in a closed loop along said guide means, power operated means interconnecting said carriage means and guide means for moving said carriage means along said guide means, cutter support means mounted on said carriage means for movement therewith, cutter means journaled on said support member for rotation thereon, drive means operatively connected to said cutter means for rotating said cutter means, a guide plate secured to the lower portion of said support frame over which fabric is moved, an anvil moveable with said carriage and cooperative with said cutter means to perform a shearing action on fabric supported by said guide plate.

4. A bias cutting apparatus for cutting elastomeric fabric comprising a support frame, guide means on said support frame providing a continuous closed endless loop, said guide means having a lower horizontal run and an upper return run, at least a pair of spaced carriage members mounted for movement in a closed loop along said guide means, power operated means interconnecting said carriage members and guide means for moving said carriage members along said guide means, a cutter support member mounted on each said carriage member for movement therewith, cutter means journaled on each of said cutter support members for rotation thereon, drive means operatively connected to said cutter means for rotating said cutter means, a guide plate secured to the lower portion of said support frame over which fabric is moved and under which a conveyor belt travels, an anvil means connected to each of said carriage members for movement therewith, each of said anvil means having a linear cutting edge, and each of said cutter means having a plurality of circumferentially spaced cutting edges that are cooperative with said anvil to perform a shearing action.

5. A bias cutting apparatus as set forth in claim 4 wherein biasing means are connected to each of said cutter means to bias said cutting edges into shearing contact with said linear cutting edge of said adjacent anvil as said cutting edges approach said adjacent linear cutting edge of said anvil.

6. A bias cutting apparatus for cutting elastomeric fabric comprising a support frame, guide means on said support frame providing a continuous closed endless loop, said guide means having an upper return portion and a lower cutting run portion, a pair of spaced carriages mounted for movement in a closed loop along said guide means journaled in said guide means and interconnecting said carriages, power operated means mounted on said support frame and connected to said interconnecting means for simultaneously moving said carriages in a closed loop, cutting means mounted on each of said carriages for movement therewith, each of said cutting means having a cutter journaled for rotation thereon, drive means mounted on each of said carriages for rotating said cutters respectively, a guide plate secured to the lower portion of said support frame over which fabric is moved and under which a conveyor belt travels, anvil means connected to each of said carriages and movable therewith, and each of said anvils guided by and cooperative with said adjacent cutter to perform a shearing action on fabric therebetween.

7. A bias cutting apparatus as set forth in claim 6 wherein each of said cutters has a plurality of circumferentially spaced cutting edges that are cooperative with adjacent ones of said anvils to perform a shearing action on fabric therebetween, each of said carriages has a cutter support member pivotally mounted thereon, each of said cutter support members has said cutting means thereon, each of said cutter support members being adjustable on said carriage to adjust the shearing angle between cutting edges of said cutter with said anvil as the cutting edge of said cutter moves across said adjacent anvil.

8. A bias cutting apparatus for cutting rubberized fabric comprising a support frame, a carriage mounted on said support frame for movement thereon, power operated means connected to said carriage for moving said carriage on said support frame, a cutter means journaled on said carriage for rotation thereon, said cutter means having a plurality of circumferentially spaced cutting edges, drive means mounted on said carriage operatively connected to said cutter means for rotating said cutter means, a guide plate secured to the lower portion of said support frame over which fabric is moved, anvil means connected to said carriage for movement therewith, said anvil means guided for movement on said guide plate, said anvil means having a linear cutting edge, and means connected to said cutter means for presenting successive cutting edges of said cutter means in shearing contact with said linear cutting edge of said anvil means.

9. A bias cutting apparatus as set forth in claim 8 wherein the contact between any of said cutting edges of said cutter means and said anvil defines an acute angle.

10. A bias cutting apparatus as set forth in claim 8 wherein a plane normal to the axis of rotation of said cutter means and passing through said cutter means makes an acute angle with a vertical plane passing through said linear cutting edge.

11. A bias cutting apparatus as set forth in claim 10 wherein said means connected to said cutter means to present said cutting edges of said cutter means into shearing contact with said linear cutting edge of said anvil means includes biasing means operative on said cutter means for biasing said cutter means toward said anvil means.

12. An apparatus for the cutting of elastomeric fabric material comprising a support frame, guide means on said support frame, carriage means mounted for movement on said guide means, power operated means operatively connected to said carriage means for moving said carriage means on said guide means, cutter support means mounted on said carriage means for movement therewith, cutter means journaled on said cutter support means for rotation thereon, drive means operatively connected to said cutter means for rotating said cutter means, said cutter means having a plurality circumferentially spaced linear cutting edges, a guide plate secured to the lower portion of said support frame over which fabric to be cut is adapted to move, anvil means connected to said carriage means for movement therewith, said anvil means having a linear cutting edge, and said spaced linear cutting edges of said cutter means being sequentially cooperative with said cutting edge on said anvil to perform a shearing action.

13. An apparatus for the cutting of elastomeric fabric material as set forth in claim 12 wherein said cutter support means is adjustable about a vertical axis to adjust the angle that said linear cutting edges of said cutter means makes with said linear cutting edge of said anvil in plan view.

14. An apparatus for the cutting of elastomeric material as set forth in claim 13 wherein power operated means is connected to said cutter support means for adjusting said acute angle in response to the direction of movement of said carriage.

15. An apparatus for cutting of elastomeric material as set forth in claim 13 wherein at least one of said linear cutting edges of said cutter means has a portion thereof in cooperative contact with said anvil at all times and makes an acute angle therewith in plan view.

16. An apparatus for the cutting of elastomeric fabric comprising a support frame, guide means on said support frame, carriage means mounted for movement on said guide means, power operated means operatively connected to said carriage means for moving said carriage means on said guide means, cutter support means mounted on said carriage means for movement therewith, cutter means journaled on said cutter support means for rotation thereon, drive means operatively connected to said cutter means for rotating said cutter means, said cutter means having a plurality of circumferentially spaced pairs of adjacent linear cutting edges, each pair of adjacent cutting edges having an apex therebetween, a guide plate secured to the lower portion of said support frame over which fabric to be cut is adapted to move, anvil means mounted in and supported by said guide plate for movement thereon, said anvil means connected to said carriage means for movement therewith, said anvil means having a linear cutting edge, and one of each of said pair of linear cutting edges of said cutter means being sequentially cooperative with said cutting edge on said anvil to perform a shearing cut on such fabric.

17. An apparatus for the cutting of elastomeric fabric as set forth in claim 16 wherein said cutter support means is adjustable about a vertical axis to adjust the angle that said linear cutting edges of said cutter means makes with said linear cutting edge of said anvil in plan view.

18. An apparatus for the cutting of elastomeric fabric as set forth in claim 17 wherein said anvil means connected to said carriage means for movement therewith includes a plurality of pulleys and cables, and said cables being trained over said pulley interconnecting said carriage means with said anvil means for movement in the same linear direction as said carriage means.

19. A bias cutting apparatus for cutting rubberized fabric with wire strands therein comprising a support frame, a pair of spaced rollers mounted on said support frame, an endless conveyor belt trained over said rollers, said belt having an upper conveying run and a lower return run, said upper conveying run having a longitudinal center line lying in a vertical plane that is normal to the axis of rotation of said spaced rollers, said support frame having a pivot means for pivotal adjustment of said support frame, a guideway mounted on said support frame, a carriage member mounted on said guideway for reciprocal movement thereon, a guide bar mounted on said support frame for pivotal movement therewith, said guide bar having a leading edge and a trailing edge, said guide bar tapering from said trailing edge of said leading edge, the lower surface of said guide bar being in contact with the upper conveying run of said belt, a cutter support member mounted on said carriage member for pivotal adjustment movement about an axis that is normal to the flat surface of said upper conveying run, means for reciprocating said cutter support member and said carriage member on said guideway, a shaft journaled in said cutter support member for rotation and limited axial linear movement in a direction normal to said axis of pivotal movement of said cutter support member, drive means connected to said shaft for rotating said shaft, one end of said shaft supporting cutter means, biasing means mounted on the other end of said shaft for biasing that portion of said cutter means adjacent to said trailing edge into contact with said trailing edge, a vertical plane containing said cutter means making an acute angle with a second plane that is vertical and passes through said trailing edge, said cutter means having a plurality of circumferentially spaced linear cutting edges, and said biasing means maintains contact with each of said linear cutting edges sequentially as said linear cutting edges of said cutter means approaches and comes into contact with said trailing edge of said guide bar.

20. A bias cutting apparatus as set forth in claim 19 wherein said guide bar includes a guideway, an anvil mounted in said guideway for reciprocal movement, said anvil having a shearing edge cooperating with said cutter means to provide a shearing action on the rubberized fabric, and connecting means interconnecting said anvil and said carriage for simultaneous reciprocal movement in the same linear direction.

21. A bias cutting apparatus as set forth in claim 20 wherein said cutter support member has means operatively con-nected thereto for changing the pivotal adjustment of said cutter support on said carriage about said pivotal axis in accordance with the direction of travel of said carriage.

22. A fabric cutting apparatus for cutting rubberized fabric having steel wire therein comprising a support frame, guideway means mounted on said support frame, carriage means mounted on said guideway means for movement thereon, a cutter support mounted on said carriage, cutter means mounted on said cutter support for rotation thereon and for movement therewith, spring means operatively engaging said cutter means for biasing said cutter means toward said cutter support, motive means connected to said cutter means for rotating said cutter means on said cutter support, a guide plate mounted on said support frame in alignment with said guideway means, anvil means mounted on said guide plate for movement thereon, means interconnecting said anvil means to said carriage for movement therewith, said anvil means having a linear cutting edge, said cutter means having a plurality of circumferentially spaced linear cutting edges, adjusting means interconnecting said cutter support and said carriage for adjusting said cutter support in a horizontal plane relative to said carriage to adjust the angular disposition of a plane passing through said linear cutting edges of said cutter means and a vertical plane that passes through said linear cutting edge of said anvil.

* * * * *